United States Patent [19]

Singhal et al.

[11] Patent Number: 5,488,385
[45] Date of Patent: Jan. 30, 1996

[54] MULTIPLE CONCURRENT DISPLAY SYSTEM

[75] Inventors: Dave M. Singhal, San Jose; Sidong Li, Sunnyvale, both of Calif.

[73] Assignee: Trident MicroSystems, Inc., Mountain View, Calif.

[21] Appl. No.: 206,010

[22] Filed: Mar. 3, 1994

[51] Int. Cl.[6] .................................................. G09G 5/12
[52] U.S. Cl. ............................................. 345/3; 345/1
[58] Field of Search .................................... 345/3, 1

[56] References Cited

U.S. PATENT DOCUMENTS

| | | | |
|---|---|---|---|
| 4,926,166 | 5/1990 | Fujisawa et al. | 345/3 |
| 4,965,559 | 10/1990 | Dye | 345/1 |

FOREIGN PATENT DOCUMENTS

| | | | |
|---|---|---|---|
| 3-107194 | 5/1991 | Japan | 345/3 |
| 4100093 | 4/1992 | Japan | 345/3 |
| 4-122985 | 4/1992 | Japan | 345/3 |

*Primary Examiner*—Jeffery Brier
*Attorney, Agent, or Firm*—Fliesler, Dubb, Meyer & Lovejoy

[57] ABSTRACT

Video information is simultaneously generated for presentation on multiple displays by a display system including a video memory having a plurality of addressable storage locations, each storage location providing for the storage of data representing a component of an independent displayable image and a video controller providing a plurality of output display control and data signals connectable to a respective plurality of video displays. The video controller accesses the video memory in a predetermined addressing pattern so as to access a sequence of the components corresponding to a plurality of the independent displayable images. The video controller, in turn, generates the plurality of output display control and data signals whereby the sequence of the components provided by way of each of the plurality of the output display control and data signals corresponds to a respective one of the independent displayable images.

10 Claims, 6 Drawing Sheets

MULTIPLE CONCURRENT DISPLAY SYSTEM

CROSS-REFERENCE TO RELATED APPLICATIONS

The present application is related to the following application, which is assigned to the Assignee of the present Application:

Constant Contrast Control for Heterogeneous Display Systems, invented by Singhal et al., TRID8000GBR, application Ser. No. 08/205,318.

BACKGROUND OF THE INVENTION

1. Field of the Invention

The present invention is generally related to a multiple display system utilizing common display control hardware and, in particular, to an optimized system for enabling the display of independent video information simultaneously on multiple displays by a single display controller.

2. Description of the Related Art

Current developments in computer system architectures, particularly typified by those used in the personal computing environment, reflect a growing emphasis on the visual display of data. The diversity of types of data displayed and the amount of data desirably displayed concurrently is increasing. Conventional personal computer systems have met this demand by providing multiple independent display adapters, each supporting the separate display of image data, to be attached to a single computer system. While this approach does permit each adapter to optimally provide for the separate generation of the image data, there is no mutual optimization within the display sub-system as a whole.

The personal computing environment is highly competitive, both in terms of cost and performance. The utilization of multiple display adapters in a single personal computer system is disadvantageous based on the substantial cost of separate display adapters that each must meet the highest possible requirements of the video display sub-system. If dissimilar display adapters are utilized, in an effort to thereby reduce cost, a significant constraint is imposed on the computer system as a whole to correctly direct display images of appropriate complexity to display adapters of corresponding capability. This selection of target display adapter may not readily be managed by the personal computer system without intervention by the computer system user. Furthermore, use of display adapters of dissimilar display capabilities imposes a physical limitation on the images that can be displayed on any particular display device.

Other related factors that are involved in the selection of a display sub-system include chip count on the display adapters, the reliability of multiple adapters, power consumption requirements, system resource consumption, and physical size requirements to support the video display sub-system. For reducing chip count and increasing reliability, as well as reducing power consumption, the number of integrated circuit chips required to support multiple independent displays should be minimized. The manufacturing cost associated with reduced chip count should also result in a cost savings in addition to a reduction in the physical space, specifically the printed circuit board space, required to implement the video display sub-system.

The necessarily competing requirement, however, is the necessity for maintaining compatibility with existing defacto standard display adapter specifications. Display adapter designs are, to maintain competitive, at least compatible with an existing display adapter standard such as the standard know as "VGA". Conventional display adapters utilize integrated circuit chip sets to implement this standard and provide for the display of a single image on a video display console. Conventional chip sets may also provide for the concurrent display of a single image on multiple video devices. This is generally performed by duplicating the output video data and control signals to provide for the simultaneous drive of separate display devices. Conventionally, however, no provision is made for the ability to support separate displayed images from a single chip set display adapter. Where multiple independent displayable images are required, the conventional design approach is to provide multiple video controller chip set for the generation of respective images on multiple display adapter boards. Even if the multiple chip sets are implemented on a common single printed circuit board, such conventional implementations fail to significantly reduce the required chip count and, thereby inherently are of lesser reliability, higher cost and consume a greater amount of power.

SUMMARY OF THE INVENTION

Thus, a general purpose of the present invention is to provide a system optimally utilizing common display control hardware for displaying independent video information simultaneously on multiple display devices.

This is achieved in the present invention by providing for the simultaneous generation of video information for presentation on multiple displays by a display system including a video memory having a plurality of addressable storage locations, each storage location providing for the storage of data representing a component of an independent displayable image and a video controller providing a plurality of output display control and data signals connectable to a respective plurality of video displays. The video controller accesses the video memory in a predetermined addressing pattern so as to access a sequence of the components corresponding to a plurality of the independent displayable images. The video controller, in turn, generates the plurality of output display control and data signals whereby the sequence of the components provided by way of each one of the plurality of the output display control and data signals corresponds to a respective one of the independent displayable images.

Art advantage obtained by the present invention is, therefore, the simultaneous generation of independent displayable images utilizing common display control hardware for the storage of the images and the generation of the display image control and data signals.

Another advantage of the present invention is that the video information constituting the displayed images may be entirely independent of one another.

A further advantage of the present invention is that the displayed images may be generated having different display resolutions and different color depths.

Yet another advantage of the present invention is that the displayed images may be generated independent of the particular display devices. That is, each displayed image may be displayed on any display device subject only to the physical display limitations of the display device.

Still a further advantage of the present invention is that efficient use is made of the video memory in storing the frame buffer data and control register data necessary to permit the generation of the multiple independent displayable images. Differences in the display resolution and color depth of the images can be balanced against one another to minimize the amount of video memory used in storage of the images.

A still further advantage of the present invention is that all of the displayable images may logically appear to be controlled by independent display subsystems, thereby maintaining a common, well defined logical interface to a host processor. The logical emulation of multiple conventional VGA display adapters permits full compatibility with conventional software to be maintained, while at the same time greatly reducing the quantity, cost and complexity of the display system hardware.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
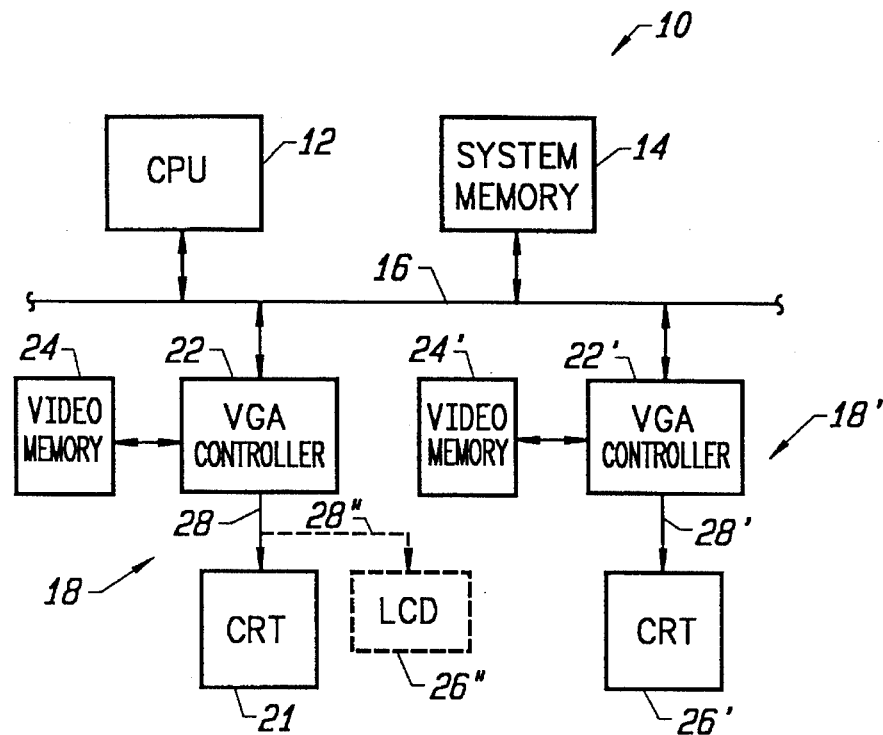
FIG. 1 provides a simplified block diagram of a conventional multiple display computer architecture.

A conventional personal computer architecture, generally indicated by the reference numeral 10 and providing for the support of multiple display devices, is shown in FIG. 1. In general, a processor 12 and system memory 14 are coupled directly or indirectly to a system peripheral bus 16 providing for the support of peripheral sub-systems including, in particular, a display sub-system. A conventional display sub-system 18 typically includes a video graphics adapter controller 22, a video memory 24 that provides control register storage, frame buffer storage, and scratch or spare memory storage for the controller 22. This controller 22 is typically a programmable device allowing multiple video display timing characteristics to be set by the processor 12 based on programmed control register values. The definition of these control registers and the corresponding function of the controller 22 are typically established in conformance with a number of industry standard display adapter model architectures or defacto standard extensions thereof. Such standards include, but are not limited to Hercules Compatible Graphics Adapter (HGA), Color Graphics Adapter (CGA), Enhanced Graphics Adapter (EGA), and Video Graphics Adapter (VGA). Documentation of these standards may be obtained from Video Electronics Standards Association (VESA), 2150 North First Street, Suite 440, San Jose, Calif.95131-2029.

The VGA architecture model generally provides a control register super-set that allows emulation of lower resolution image architecture models. Accordingly, a VGA controller 22 is conventionally capable of generating the timing control signals necessary to drive a CRT 26 at a variety of line, refresh and frame timings. The VGA controller 22 provides these timing control signals, as well as video data, via the output control and data lines 28.

The flexibility of the personal computer architecture, in general, permits at least a second video display sub-system 18' to be coupled to the peripheral bus 16. The VGA controller 22' and video memory 24' are logically distinguished from the controller 22 and memory 24 by being addressable at a unique set of I/O and memory address locations. Consequently, the display sub-systems 18, 18' function completely independent of one another. As such, particularly owing to the complete duplication of the sub-system components, a second CRT 26' or other display device can be driven by the system 10.

The duplication of video sub-systems 18, 18', as conventionally implemented, results in a duplication of the physical space, power and configuration complexities as well as permitting a second viewable image. However, in smaller personal computer systems, as may be typified by the so-called notebook computers, the duplication in space, power and cost for multiple display sub-systems is prohibitive. Instead, in order to provide a second display device, a constraint to non-independent displayable imaged is accepted by the parallel addition of a liquid crystal display 26" to the output control and data lines 28" of the VGA controller 22.

An often proprietary logical extension to the VGA controller 22 allows support of the LCD panel 26" through the generation of appropriate control signals to drive the panel 26. The logical extension of the VGA controller 22 is necessary in order to mask the fact that an LCD display 26" is being driven rather than a conventionally standardized CRT type device. The VGA controller 22 thus appears to application programs executing on the processor 12 to be driving a conventional VGA type CRT 26, for example, while in fact producing the timing control and data signals appropriate for the LCD display 26". However, when both the CRT 26 and LCD 26" are driven, the in-parallel drive timing of the LCD panel 26" must be compromised to allow for the vertical retrace time required by the CRT display 26 during each frame time. This is conventionally accomplished by outputting each line of data to both the CRT and LCD simultaneously. Thus both the line times and display times for the CRT 26 and LCD 26" are identical. The resulting blanking of both the CRT and LCD display notably degrades the contrast quality of the LCD.

Figure 2:
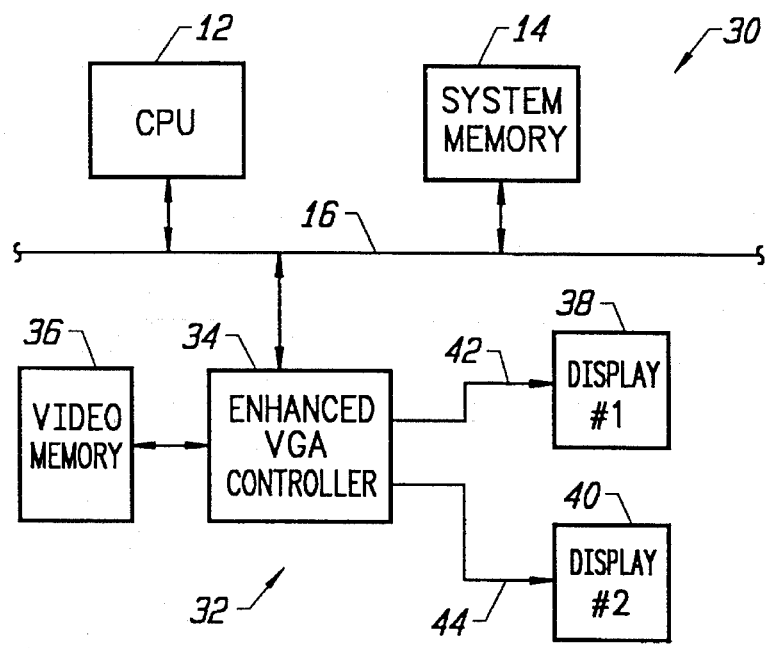
FIG. 2 provides a simplified block diagram illustrating the preferred multiple display computer architecture of the present invention.

A personal computer system architecture 30 implementing a video display sub-system 32 in accordance with a preferred embodiment of the present invention is shown in FIG. 2. An enhanced VGA controller 34 utilizes a video memory 36 as a control register store, frame buffer store and spare memory store in support of two display devices 38, 40. The function of the enhanced VGA controller 34 is to effectively emulate, essentially in a single integrated circuit, two complete VGA controllers, each functionally comparable to the VGA 22, but with some limiting interdependencies related to the access rate and capacity of the shared video memory 36 and the number and nature of any configuration registers that are functionally shared in defining the operation of both of the display devices 38, 40. In the preferred embodiment, the enhanced VGA controller 34 implements separate registers related to establishing the resolution of the display devices 38, 40, but shares the registers that establish the display mode. Thus, both display devices are limited, though only as a practical consequence of the register independence chosen for the preferred embodiment, to operating concurrently in the common text or graphics mode.

Figure 3A:
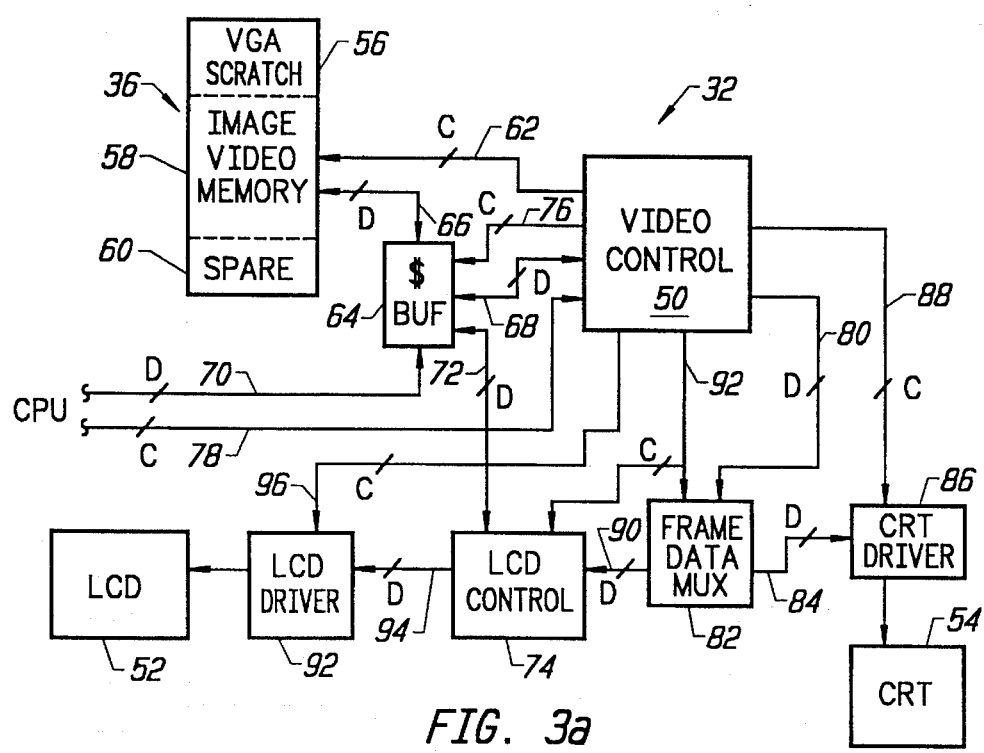
FIG. 3a provides a detailed block diagram of the video controller subsystem utilized by a preferred embodiment of the present invention.

As illustrated in FIG. 3a, the video display sub-system 32 utilizes a single video control unit 50 to implement the dual VGA controller emulation. The video control unit 50 also generates the control and timing signals and directs the transfer of video data to two independent display devices that are, in the preferred embodiment, also distinctly different in their intrinsic timing requirements. In the preferred embodiment, the display devices are VESA standard resolution devices including a 640 by 480 pixel resolution STN LCD panel 52 and a conventional high-resolution CRT display 54. The VGA register control data programmed by the CPU 12 to control the operation of the video controller 50 is stored in registers internal to the video control unit 50. A scratch video/control data area may exist in the video memory 36 in a scratch storage area 56. Depending on the control software executed by the processor 12 in management of the video display sub-system 32, two banks of scratch/control data storage area may be utilized in support of the respective configurations desired for the display devices 52, 54. Each bank is identified by a unique set of I/O addresses to the processor 12.

One or more frame buffers for the display devices 52, 54 are also provided in an image storage area 58, while a spare storage area 60 provides for temporary storage of frame data lines. The video controller 50 selects data locations within the video memory 36 via control and address lines 62. Although the video memory 36 will typically include a plurality of RAM chips, the video memory 36 is, as a whole, a single logical memory space. Consequently, optimum use can be made of the total frame data image storage area 58 dependent on the desired resolution and color depth for the display devices 52, 54.

In the preferred embodiment, all data transferred relative to the video memory 36 passes through a cache buffer circuit 64 that provides for multiple buffered data paths. The cache buffer 64 is preferably a multiplexed set of parallel FIFO buffers sharing a common data path 66 to the video memory 36, though otherwise having separate data path connections. One such other data path connection is to a bus 68 that provides for the transfer of control and frame data between the video controller 50 and video memory 36. Another data connection is to the peripheral bus 16 via the data lines 70. Finally, in the preferred embodiment, a data connection is made between the cache buffer 64 and an LCD controller 74. Control over the cache buffer 64 is provided by the video controller 50 via control lines 76.

In the preferred embodiment, the video controller 50 supervises transfers of data between the processor 12 and the video memory 36. The control lines 78 provide the necessary handshake control signals to the video controller 50 via the peripheral bus 16.

The primary function of the video controller 50 is to transfer frame data from the image memory section 58 of the video memory 36 to a frame data multiplexer via data lines 80.

Figure 4:
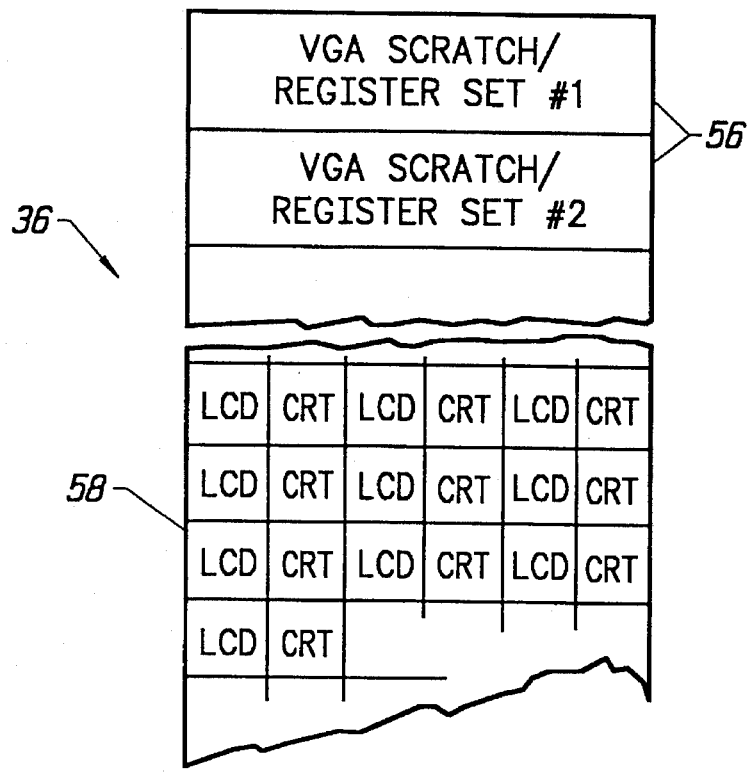
FIG. 4 is an illustration of the preferred logical organization of the video memory control register and frame buffer.

A representative illustration of how data is stored in the video memory 36 is shown in FIG. 4. In the preferred embodiment of the present invention, a VGA scratch memory area is mapped to data storage locations 56 within the video memory 36. The frame buffer 58 consumes the largest portion of the video memory 36. In the preferred embodiments of the present invention, where independent images are to be simultaneously displayed, the frame data for the separate display devices 52, 54 is stored in an interleaved or alternating series of data storage locations. As shown, a preferably 32 bit word of frame data is stored in alternating word locations for each of the display devices.

The video memory 36 is preferably constructed utilizing RAM integrated circuits supporting a page or burst mode of operation allowing a high rate of access to a short series of consecutive storage locations within the video memory 36. Typically, such conventional integrated circuit RAMs specify a shortened read access time for the second through fourth byte data reads following an initial byte data read aligned on a 32 bit word boundary.

In support of this optimal interleaving of the frame data for separate display devices, the video controller 50 logically addresses the frame buffer 58 as two independent memory spaces relative to the processor 12. However, the resulting physical addressing of the frame buffer 58 provides for the interleaved storage of frame data words as illustrated in FIG. 4. Consequently, the highest possible data bandwidth is provided between the frame memory 58 and video controller 50 while remaining consistent with the logical appearance of two separately addressed and otherwise independent video memories.

The video controller 50, implementing a video sequencer state machine, transfers frame data at control register selected timing intervals via the data bus line 80 through a frame data multiplexer 82 for de-multiplexing the frame data words. By de-multiplexing the frame data words, frame data appropriate for the CRT display device 54 is transferred to a CRT driver 86 via data bus lines 84. Video control signals synchronized with the transfer of the video data are provided by the state machine of the video controller 50 to the CRT driver 86 via the control lines 88. The CRT driver 86 then provides a conventional series of controlling data signals to the CRT 54 with line, display, and frame timing appropriate to display the intended image on the CRT 54. These control signals typically include horizontal sync (HSYNC) and vertical sync (VSYNC).

De-multiplexed data from the frame data multiplexer 82 is also provided by the data lines 90 to the LCD controller 74. The frame data multiplexer 82 and LCD controller 74 operate in response to control signals from the video controller 50 provided via the control lines 92. These control signals are used to direct the synchronous processing of the video data. The LCD controller 74 functions to transfer video data to an LCD driver circuit 92 via data lines 94. The LCD driver 92, in response to control signals from the video controller 50 as provided via the control lines 96, supplies video line data to the LCD panel 52.

The LCD controller 74 also utilizes the data path connection 72 to the cache buffer 64 to provide for the temporary storage of frame data in the spare memory section 60 of the video memory 36. The temporary storage of frame buffer data in the spare memory area 60 permits a variable delay to be introduced in the timing of the display of the frame data.

Figure 3B:
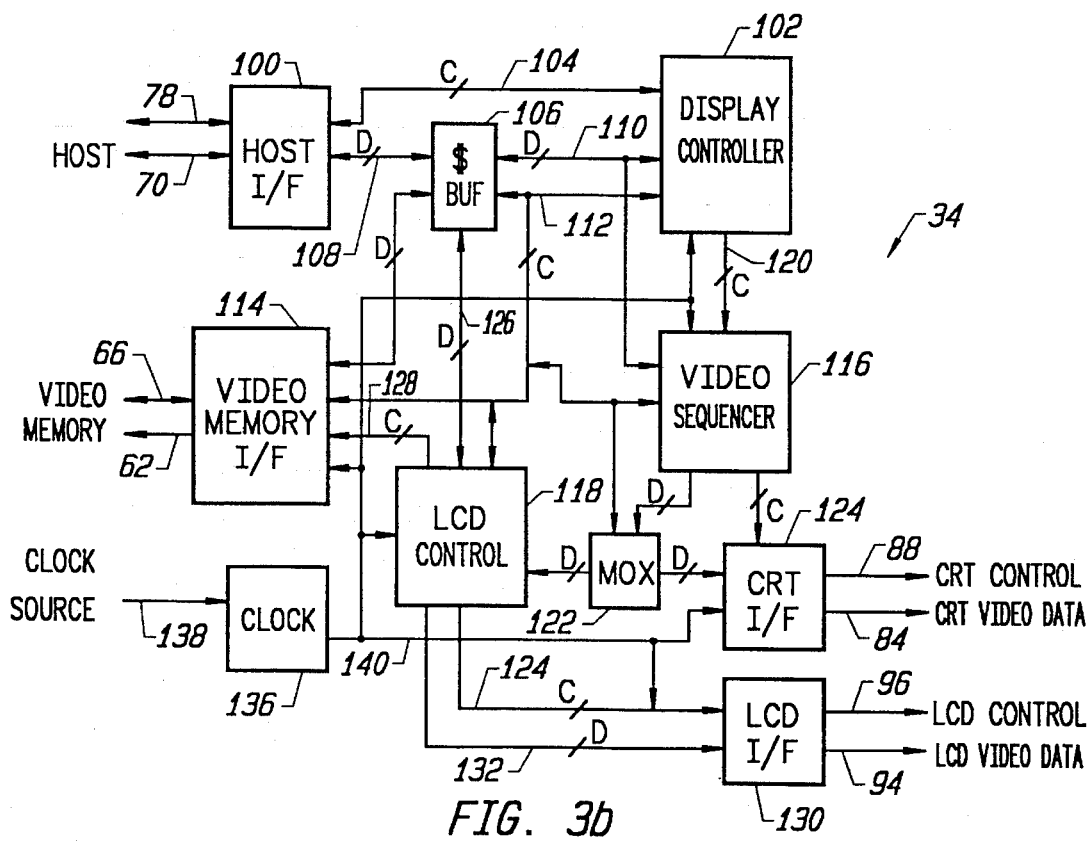
FIG. 3b provides a detailed block diagram of the integrated circuit implementation of the video display controller utilized by a preferred embodiment of the present invention.

The preferred design of the enhanced VGA controller 34 of the present invention, as implemented in a preferred single integrated circuit configuration, is shown in FIG. 3b. A host interface unit 100 provides an up to 32 bit wide data path to the peripheral bus 16 via data lines 70. Control lines 78 provides for a conventional peripheral bus interface including an interrupt output line, I/O channel ready (IOCHRDY) line and a 26 bit wide I/O and memory interface for addressing the VGA register sets and frame buffer managed by the enhanced VGA controller 34. These control and address signals are provided by way of the control lines 78. A display controller 102 exchanges control signals with the host interface 100 via control lines 104 to coordinate the transfer of register data to appropriate register locations within the video memory 36 and the transfer of frame data between the processor 12 and image video memory 58. The image frame data is transferred via a cache buffer 106 to the host interface by way of data lines 108 and to the display controller 102 via data lines 110. The coordinated operation of the cache buffer 106, a video memory interface unit 114, a video sequencer unit 116 and an LCD controller 118 is managed by way of a commonly connected internal control bus 112. The video memory interface 114 supports a 32 bit wide data bus to the video memory 36 and provides read and write control signals in addition to appropriate timing control signals to support the operation of conventional dynamic RAM integrated memory circuits. The video memory interface 114 also supports a 10 bit wide address bus for the video memory 36. Thus, the video memory 36 is preferably a one megabyte memory array organized for four byte wide data reads and writes.

The video memory interface unit 114, in response to the control signals provided on the control bus 112, supports directly addressable data transfer operation to the scratch memory area 56. The interface 114 also supports separate sequential memory fetch operations for the video sequencer 116 and LCD controller 118 directed respectively to the image video memory portion 58 and spare portion 60 of the video memory 36. The video sequencer 116, when enabled via the control lines 120, controls, as a consequence of the internal state machine operation, the sequential fetching of video data via the control lines 112. The received frame data is obtained by the video sequencer 116 via the data bus 110. This data is transferred to a frame data multiplexer 122 for delivery to a CRT interface unit 124 and to the LCD controller 118. To support the display of independent display images, the multiplexer provides alternating 32 bit words of the frame data to the CRT interface unit 124 and LCD controller 118 synchronized with the operation of the video sequencer 116. Where identical frame data is to be provided to both the LCD controller 118 and CRT interface 124, the video sequencer 116 preferably functions to replicate the frame data received via the data bus 110 and directs the operation of the multiplexer 122 via control lines 112 to deliver the original and replicated frame data to the LCD controller 118 and CRT interface 124 in alternating de-multiplexer cycles. Alternately, the state machine operation of the video sequencer 116 may again reduce the frame data fetch rate and, by configuring the multiplexer 122 to simply pass multiplexer input data to both outputs simultaneously.

The LCD controller 118, in general, initially processes the video data from an initial space and color encoded format to a compressed and encoded space, time and color format appropriate for use with an STN LCD panel. The resultant frame data is then immediately transferred via the multiplexer 122 through the cache buffer 106 to the spare memory area 60 of the video memory for temporary storage. With the storage of each frame data word, the LCD controller 118 directs the retrieval of a previously stored frame data word from a different location within the spare memory area 60. These data transfers are performed directly between the LCD controller 118 and cache buffer 106 via data lines 126 in response to LCD controller originated signals on the control lines 128 provided directly to the video memory interface unit 114. These data transfers are further coordinated with the operation of the display controller 102 and video sequencer 116 by way of LCD controller originated signals directed onto the internal control bus 112. Finally, the LCD controller 118 provides for the transfer of frame data to an LCD interface unit 130 via data line 132. Control signals, such as dot clock (Shift Clk), line pulse and frame sync (First Line Marker), are also generated by the LCD controller 118 and provided to the LCD interface unit 130 via control line 134. The line pulse signal is functionally similar to the horizontal synch signal provided by the CRT interface unite 124. Likewise, the frame sync signal is fundamentally similar to the vertical synch signal.

Finally, a clock unit 136 is provided to synchronize the operations of the display controller 102, video sequencer 116, video memory interface 114, LCD controller 118, and CRT and LCD interfaces 124, 130. A source clock signal is provided typically from a fixed crystal reference on control line 138 to the clock unit 136. Appropriate clock signals are then generated and provided on the internal clock lines 140.

Figure 5A:
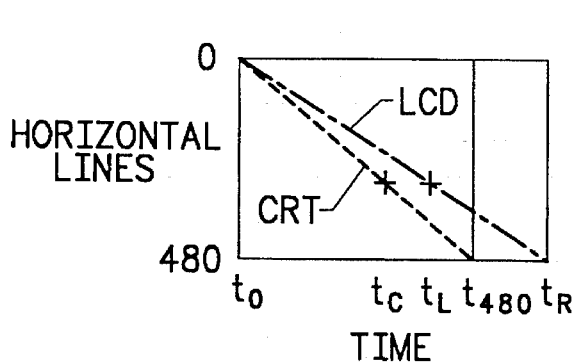
FIG. 5a is a video timing diagram illustrating the delayed display of single panel LCD video pixel lines following from the display access of CRT video pixel lines in accordance with a preferred embodiment of the present invention.

A basic mode of operation, consistent with the principles of the present invention, is illustrated in FIG. 5. The simplest operating circumstance, utilizing a single STN LCD panel, is shown in FIG. 5a. The vertical scale of the diagram represents the display lines. The horizontal scale represents the time from $t_0$, or the beginning of a new frame time. As shown, 480 vertical lines are identified as being displayed, appropriate for a "VGA" standard compatible LCD or CRT device, between the time $t_0$ and a time $t_{480}$ encompassing the frame display time. A blanked interval between $t_{480}$ and $t_R$ corresponds to the frame refresh time specifically of a CRT device.

Recognizing that each horizontal line corresponds to an entire horizontal line of frame data, the present invention provides for each horizontal line of data to be stored temporarily under the direction of the LCD controller 118 and subsequently be returned for transfer to an LCD panel. As shown, the horizontal line data transferred to the CRT interface 124 at time $t_c$ is effectively delayed by operation of the LCD controller 118 until time $t_L$ when the retrieved data is provided to the LCD interface 130. As indicated in FIG. 5a, this results in a divergence in the timing of the presentation of each vertical frame line to the CRT and LCD device. The divergence is preferably equal to the retrace time ($t_R$-$t_{480}$) of the CRT device. Thus, where an image is being displayed on both the LCD and CRT device, the display time of the LCD panel becomes substantially equivalent to the frame time of the CRT device. Conversely, where the CRT device is not being used for the simultaneous display of an image, the timing characteristics of the LCD panel alone are controlling. That is, no progressive delay in displaying LCD from lines need be introduced by operation of the LCD controller 118. Since the time point $t_R$ is the time $t_0$ for the immediately following video frame, horizontal line data is always provided to LCD panel in a discreetly continuous manner while the corresponding frame line data is provided if at all in advance to the CRT device. Thus, the intrinsic timing of a CRT device, requiring a display time and a retrace time, is fully supported by the present invention. When data is to be provided to both the CRT and LCD panel, the nominally intrinsic timing requirement of the LCD panel is extended such that the display time of the LCD panel is substantially equivalent to the total frame time of the CRT device. This extended timing mode may be involved and maintained wherever a CRT display might be in use, though the maximum LCD contrast available will be reduced concomitantly.

Figure 5B:
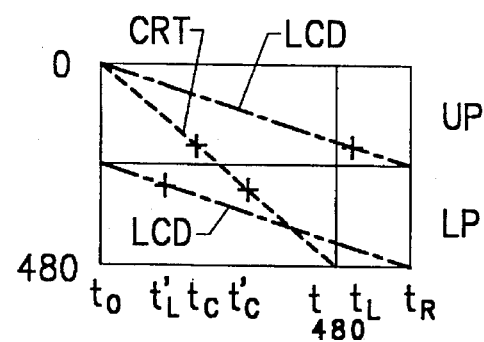
FIG. 5b is a video timing diagram illustrating the delayed display of dual panel LCD video pixel lines following from the display access of CRT video pixel lines in accordance with a preferred embodiment of the present invention.

A more complex operational example is provided in FIG. 5b. Here, the LCD panel consists of upper and lower (UP,LP) panel portions. For simplicity, the vertical and horizontal scales of the diagram are the same as in FIG. 5a. The CRT transfer line, indicating the frame line transfer timing of horizontal line data, extends for the duration of the frame display time between $t_0$ and $t_{480}$. Two separate LCD transfer lines, corresponding to the upper and lower panels, extend between $t_0$ and $t_R$, each in their respective panels. In accordance with the preferred embodiment of the present invention, the horizontal line data provided to the CRT interface 124 at, for example, $t_c$ is simultaneously stored by the LCD controller 118 until a time $t_L$ when it is retrieved and provided to the LCD interface 130. At a time $t'_c$, horizontal line data is again stored by the controller 118. However, the data retrieved by the controller 118 for the same horizontal line is retrieved at a time $t_L'$, which is prior to $t_c'$. Consequently, the data retrieved at $t_L'$ corresponds to the prior frame of data displayed by the CRT device. The data stored by the controller 118 at $t_c'$ is thus not displayed until the following frame. This mis-registration of frame data continues until the crossing point of the LCD and CRT transfer lines in the lower panel. Thereafter, for the duration of the frame, both the CRT and LCD lower panel display data again represent the same frame of data. This skew across adjoining frames is, in general, acceptable. Only in the instance of high resolution, high speed graphics display does this skew of relative currency of horizontal line data become problematic. Since a significant portion of the horizontal lines of data displayed on the lower panel correspond to a prior frame of data specifically relative not only to the CRT display data but more significantly to the data displayed on the upper panel, a discontinuity will result in the appearance of high speed graphical data when display on the LCD panels.

Figure 6A:
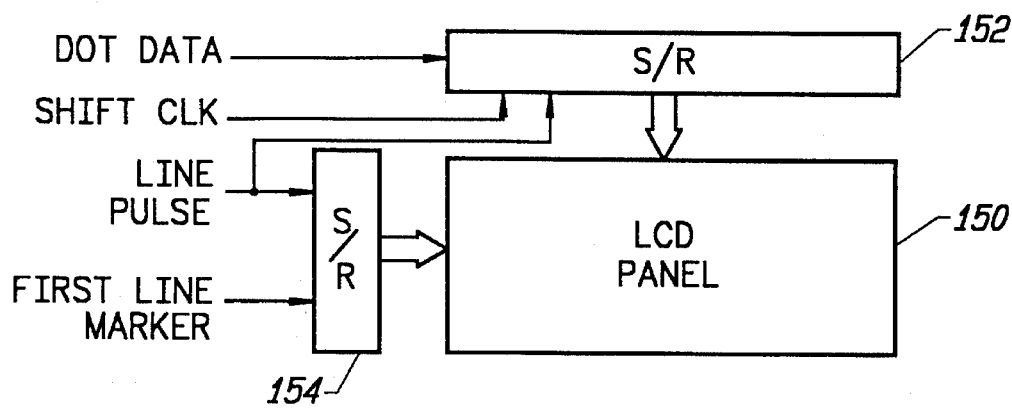
FIG. 6a is a simplified block diagram of the operative structure of a conventional single LCD panel.

In order to better understand alternate operating modes of the present invention that avoid the above described discontinuity problem, the structure of a conventional single panel STN LCD is discussed in connection with FIG. 6a. The conventional LCD panel 150 is a line oriented device in that only a single horizontal line of LCD cells are driven at any one time. A serial shift register 152 having a bit length equal to the pixel width of LCD panel 150, is used to store an entire line of display data. This data is provided as a frame line of serial bussed dot data from the LCD interface 130. A dot shift clock is also provided to clock the serial transfer of one or more dot data into the shift register 152. The LCD interface 130 also provides the line pulse and first line marker signals to a shift register 154 that functions to sequentially select a single line of the LCD panel 150 to receive the shift register stored data. The line selection bit is provided by the first line marker signal. The selection bit is clocked through the shift register 154 in response to the line pulse signal. The frame line data is transferred to the panel in a single parallel bit transfer from the shift register 152 in response to each line pulse signal. The panel includes a register for storing the transferred frame line data. As shown, the line pulse signal is used by both the shift register 152, to enable the parallel bit transfer, and by the shift register 154, to enable the decoding of a new line address. Thus, the parallel data transferred to the LCD panel defines the display state of an entire horizontal line until a subsequent line pulse is received selecting a new horizontal display line and transferring a new line of data to the LCD panel 150.

Figure 6B:
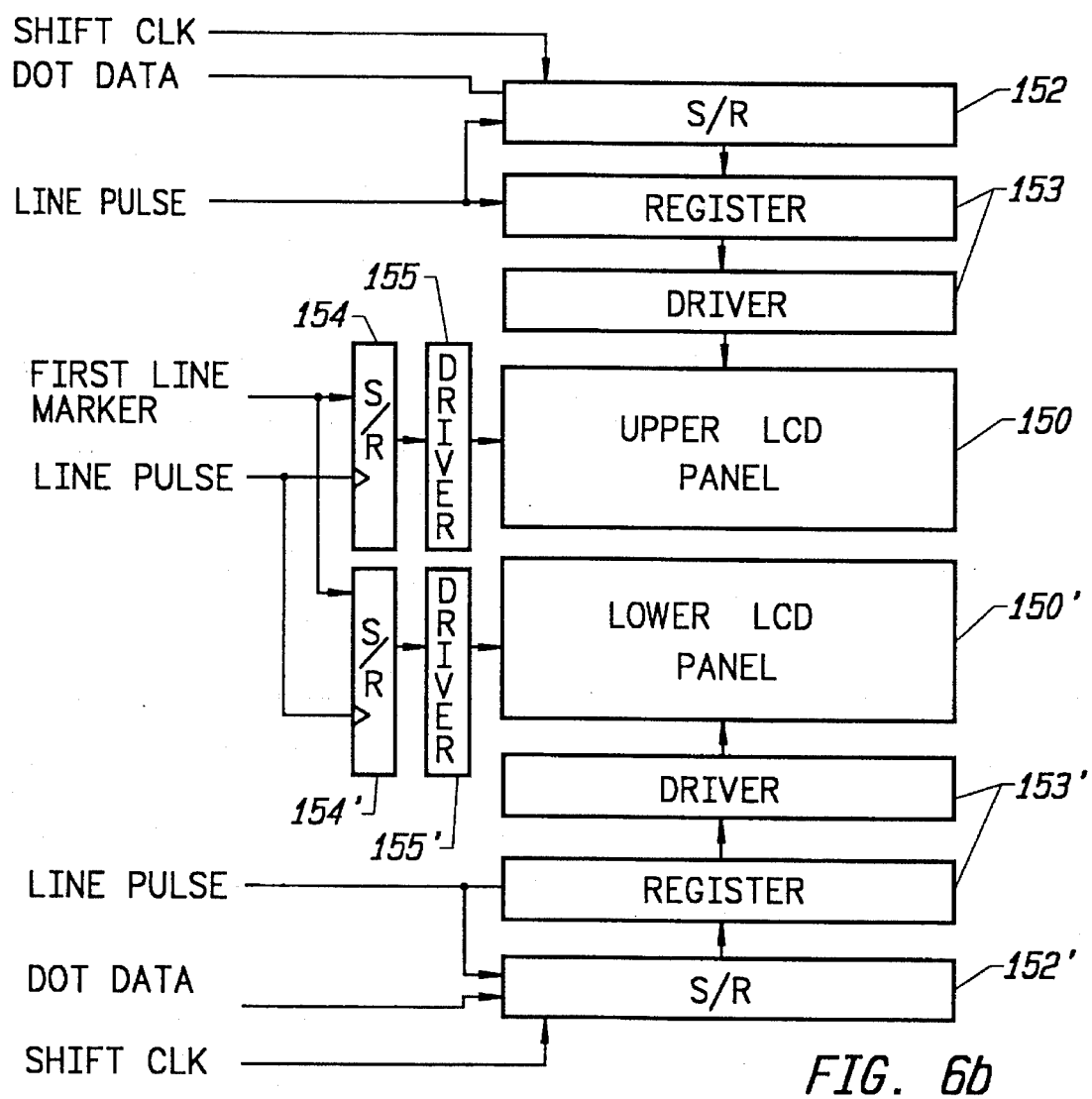
FIG. 6b is a simplified block diagram of the operative structure of a conventional dual LCD panel.

FIG. 6b provides a more detailed block diagram of a dual LCD panel system. The two display panels operate in parallel from independently provided dot data. All control signals, however, are shared. As in the single panel configuration, dot data is sequentially provided to the shift registers 152, 152' in response to the shift clock signal. The line pulse signal transfers frame line data from the shift register 152, 152' to the register/drivers 153, 153' that drive the column lines of the panel 150, 150'. The first line marker signal, provided generally synchronously with the transfer of first frame line data from the shift registers 152,152', in response to a line pulse signal, selects the first rows of the panels 150, 150' to be driven by the row driver circuits 155, 155'.

Figure 7:
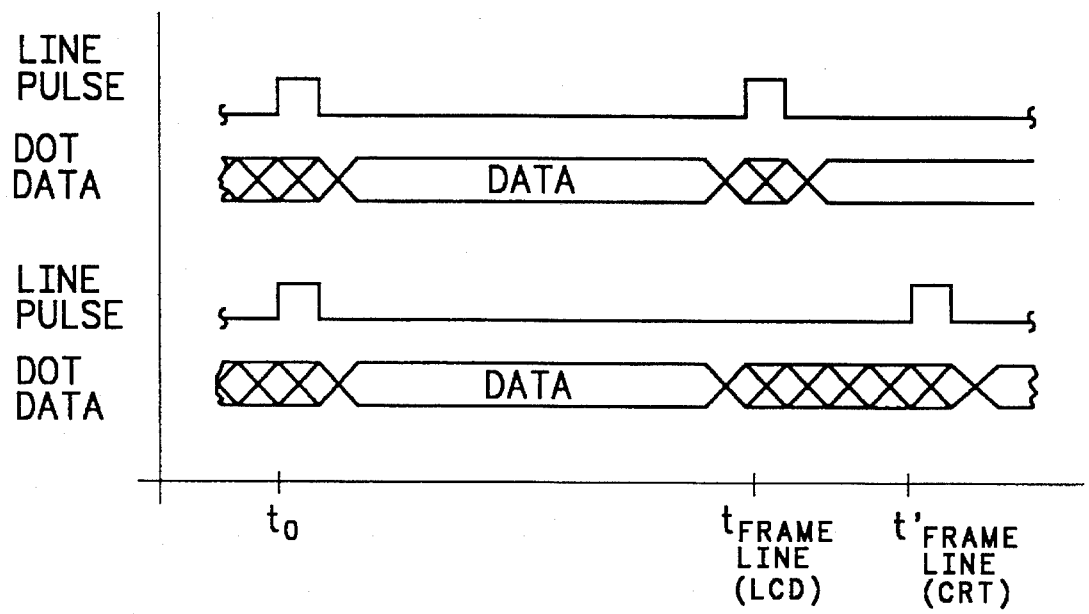
FIG. 7 is a timing diagram illustrating the alteration of the line pulse video timing characteristic utilized for LCD panels in accordance with a preferred embodiment of the present invention.

Referring now to FIG. 7, a timing diagram illustrates the modification to the intrinsic frame line timing of the LCD panel in accordance with the present invention. As shown at the top of the diagram, a line pulse is provided to an LCD panel with a cycle time substantially equal to the frame line time, or $t_{480/480}$. This corresponds to the nominally intrinsic timing of the LCD panels without alteration providing for the display of an image on a CRT device. Following the line pulse at $t_0$, dot data is provided to the serial shift register 152 at the dot clock rate. The frequency of the dot clock is sufficient to transfer an entire line of dot data to the serial shift register 152 before the next occurrence of a line pulse.

In accordance with the present invention, the line pulse timing provided via the LCD interface 130 is altered, to effectively change the intrinsic timing of the LCD panel when simultaneous display of an image on a CRT device is desired. Again, a line pulse is provided at $t_0$ for each vertical line of LCD panel displayed data. The frequency of the line pulse, however, is modified, specifically extended, by a ratio proportional to the ratio of $t_R$ to $t_{480}$ the number of horizontal display lines. Although the line pulse timing is modified, the intrinsic frequency of the dot clock is not modified. The serial shift register 152 is thus preloaded with dot data at the nominally intrinsic rate of the LCD panel. Consequently, each horizontal line of data displayed by the LCD panel is driven for a relatively extended period of time such that the cumulative extension in time for each nominal frame display time is substantially equal to the refresh time of a CRT. A line of the LCD panel is thus being driven by the LCD interface 130 in uniform consecutive sequence across the entire period of a CRT defined frame time. Accordingly, the effective contrast of STN type LCD display panels is distinctly improved.

Figure 8:
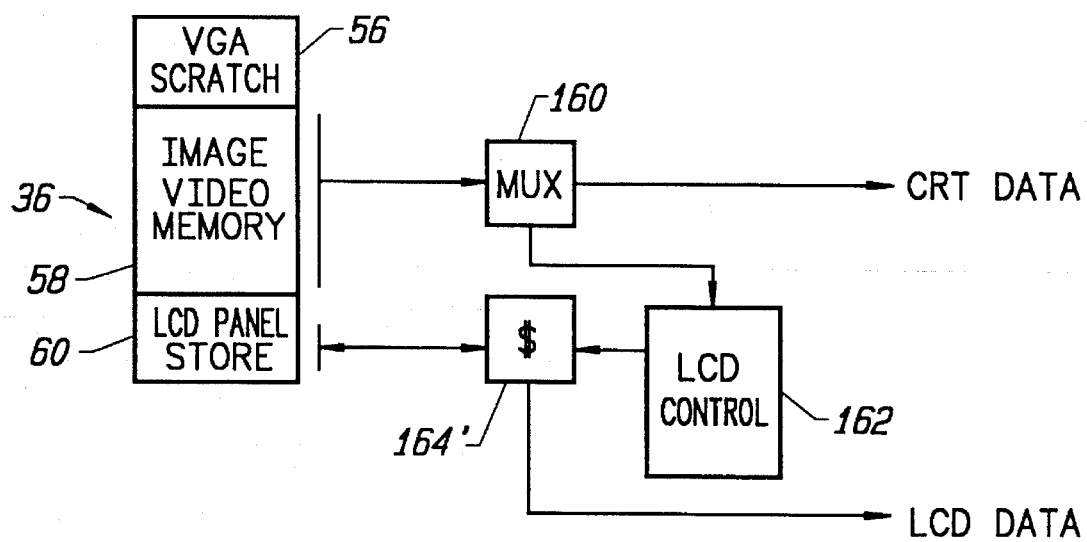
FIG. 8 is a simplified block diagram illustrating the rebuffering data transfer paths for LCD single panel displays.

The data path utilized in the preferred modes of operation of the present invention is illustrated in FIG. 8. Frame data is obtained from the image video memory area 58 of the video memory 36 and passed through the multiplexer 160 to appropriately route the frame line data to the LCD controller 162 alone or in addition to the CRT interface. Where a simultaneous image is to be presented on both the LCD panel and a CRT device, the LCD data controller 162 initially processes and then passes the received data through a cache buffer 164 to the spare storage area 60 of the video memory 36 for temporary storage. A progressively delayed retrieval of this data is then controlled by the LCD controller 162 whereby the data is read out of the storage area 60 and passed out a LCD data again via the cache buffer 164.

The amount of temporary LCD panel storage required in the spare area 60 depends on the mode of operation of the LCD panel. As illustrated in FIG. 5a, the progressive delay of the retrieval of LCD data from the LCD panel store area 60 is defined by the area between the trace lines identified as CRT and LCD. As can be seen from this illustration, the LCD panel storage area 60 need only be sufficient to store the frame lines of the remaining vertical lines to be displayed on the LCD when the CRT scan is complete at $t_{480}$, or typically 45 frame lines of data lines.

Figure 9:
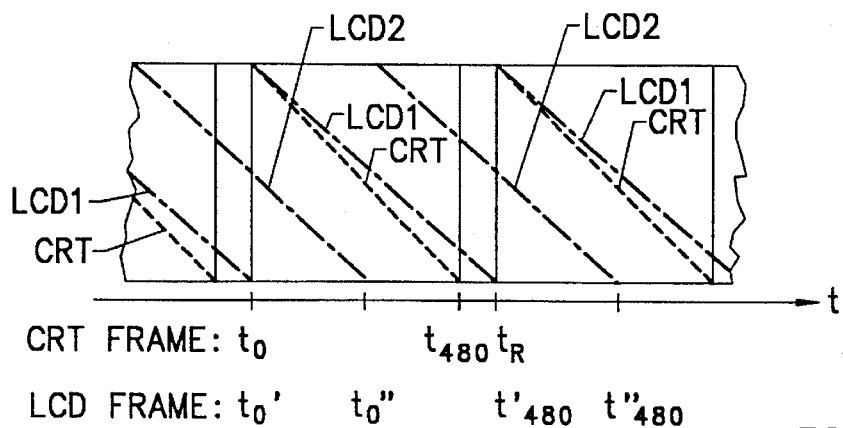
FIG. 9 is a video timing diagram illustrating the delayed display of multiple LCD video pixel lines on a single and dual panel display following from the display access of CRT video pixel lines in accordance with a preferred embodiment of the present invention.

The effective contrast of the LCD panel can be further improved by doubling the vertical line refresh rate of the panel. Reference is now made to FIG. 9, where the vertical and horizontal scales are the same as defined in relation to FIG. 5a and the trace line LCD 1 corresponds to line LCD in FIG. 5a. A second line identified as LCD 2 in FIG. 9 graphically indicates a second scan of the LCD panel within a single LCD frame time. This operation of the LCD panel, however, requires that the panel be divided into upper and lower panels in order to support the simultaneous but independent refresh of horizontal line data to the LCD panel. As before, CRT video data is stored by the LCD controller 162 and, retrieved with a progressive delay corresponding to the line LCD 1. At $t_0''$, equal to one half of the LCD display frame time, the first horizontal data lines for both the upper and lower panels are transferred from the LCD panel storage area 60 for display. The last horizontal data lines are transferred to the upper and lower LCD panels at time $t_R$, equal to the LCD frame time $t_{480}''$. Consequently, each of the upper and lower LCD panels are refreshed in their entirety during the single frame time of the CRT.

Figure 10:
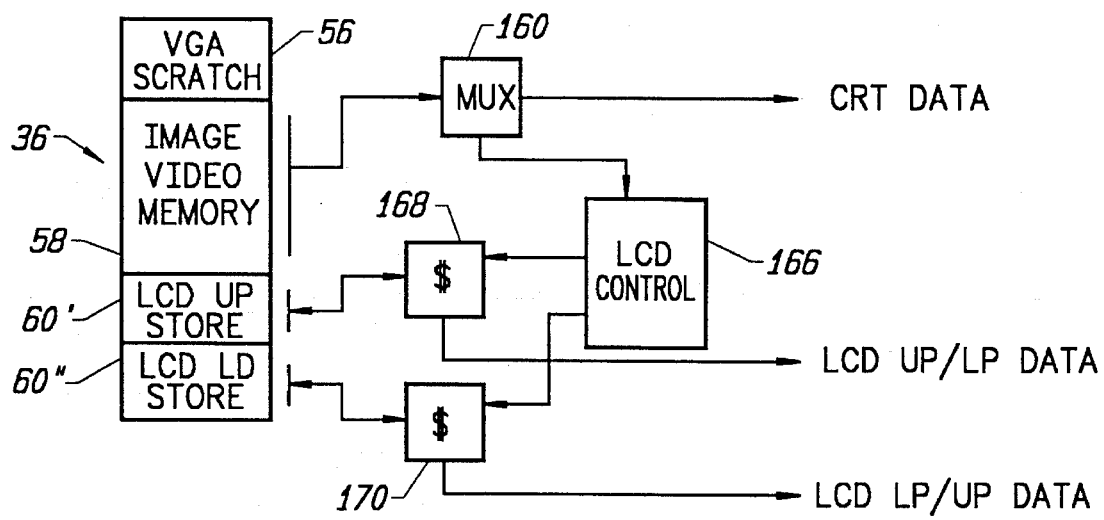
FIG. 10 is a simplified block diagram illustrating the rebuffering data transfer paths for LCD dual panel displays.

A modification of the data paths, as necessary to support the doubled scan rate LCD panel refresh scheme, is illustrated in FIG. 10. As before, LCD panel data is provided via the multiplexer 160 to the LCD controller 166. Separate upper and lower cache buffers 168, 170 are provided to support effectively parallel data reads and writes to corresponding LCD panel storage areas 60', 60" in the video memory 36. The LCD controller 166 transfers horizontal line data to either cache buffer 168, 170 depending on whether the current CRT scan line corresponds to the upper or lower LCD panel. Effectively simultaneous data transfers are made from the storage areas 60', 60" to provide the horizontal line data corresponding to the LCD 1 and LCD 2 trace lines of FIG. 9. Consequently, the video data rate to the LCD panel is supported at effectively twice that of the CRT data rate.

Figure 11:
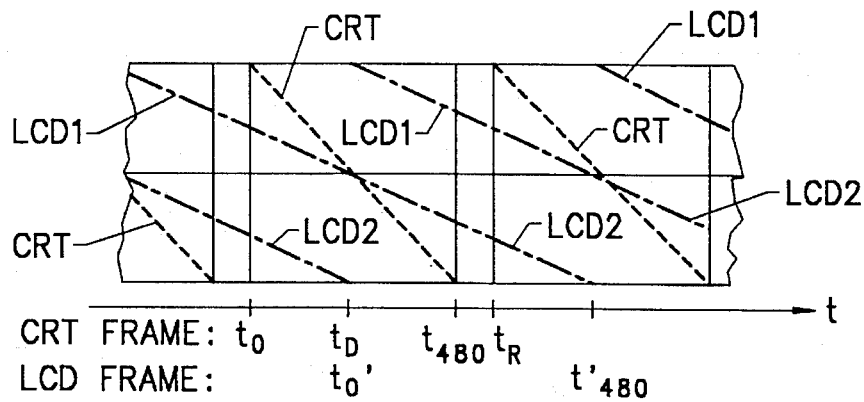
FIG. 11 is a video timing diagram illustrating the delayed display of multiple LCD video pixel lines on a dual panel display following from the display access of CRT video pixel lines in accordance with a preferred embodiment of the present invention.

Another operating mode of the present invention is illustrated in FIG. 11. While the doubled scan rate system illustrated in FIG. 9 provides perhaps the maximum display contrast and presents no high speed graphics display discontinuities, the combined storage requirements of the LCD upper panel and lower panel storage area 60', 60" is equal to an entire LCD frame. Furthermore, the timing requirements and required data bandwidth of the video memory 36 is substantially increased by the increased rate of addressing and storage retrieval from the memory 36. The mode of operation illustrated in FIG. 11, however, obtains substantially the same results as the mode shown in FIG. 9, though without requiring an increased video memory data retrieval bandwidth. At a CRT frame time of $t_0$, horizontal line data for the first scan line of the LCD upper panel is stored in the LCD upper panel storage area 60'. This LCD line data, rather than being retrieved subject to a progressive delay starting at $t_0$, is delayed by a period equal to one half of the display time of the CRT. Thus, the first horizontal scan line of the lower panel of the LCD is obtained by the LCD controller 166 and immediately provided to the lower panel for display. Storage of the data lines in the lower panel storage area 60" is performed at the CRT trace line times in the lower panel. The lower panel data is subsequently retrieved at a progressively increasing delay. This delay is equivalent to the progressive delay in the retrieval of the LCD 1 data for the upper panel as well. Consequently, the LCD frame line data for both the upper and lower panels during a single LCD frame time is from the same frame stored in the image video memory area 58. Consequently, no graphical anomaly will occur.

A flexible system providing for the display of video data representing identical or independent video images on heterogeneous display devices has been described. The principal control electronics as described, is suitable for integration on a single integrated circuit.

Many modifications and variations of the present invention are possible in light of the above description of the preferred embodiments. These modifications may include the use of dual port or multi-ported video memory in place of the conventional single port dynamic RAM utilized in the preferred embodiments of the present invention. Other modifications may include providing multiple LCD controllers and CRT interfaces so as to flexibly permit multiple LCD and/or CRT devices to be driven by the integrated circuit of the present invention. Furthermore, the functions of the display controller and video sequencers may be enhanced to take advantage of and emulate other video graphics adapter standard architectures as presently and subsequently developed. Therefore, within the scope of the appended claims, the present invention may be practiced otherwise than as specifically described above.

We claim:

1. A display system providing for the simultaneous accelerated generation of independent video information for presentation on multiple independent displays, said display system comprising:

a) a video memory having a plurality of addressable storage locations, each storage location providing for the storage of data representing a component of an independent displayable image, said video memory providing for accelerated accessing of said addressable storage locations within pages of said addressable storage locations;

b) a data buffer having a first data interface coupled to said video memory and a second interface data interface coupleable to an external host computer system to provide a direct data transfer path to said video memory; and c) a video controller, coupled to said video memory, to provide a plurality of sets of output display control and data signals coupleable to a respective plurality of video displays, said video controller including means for accessing said video memory in a predetermined addressing pattern to access a sequence of said components corresponding to a plurality of said independent displayable images where said components of a first independent displayable image are interleaved with said components of a second independent displayable image in predetermined ones of said pages of said addressable storage locations, said video controller further including control means, responsive to said accessed sequence of said components, for generating said plurality of sets of output display control and data signals where each said set of said plurality of said output display control and data signals corresponds to a respective one of said independent displayable images.

2. The display system of claim 1 wherein said predetermined addressing pattern includes a repeating pattern of sequentially accessing consecutive successive series of respective components of each said independent displayable image.

3. The display system of claim 2 wherein said video controller provides first output display control and data signals to a first video display and second output display control and data signals to a second video display and wherein said predetermined addressing pattern includes alternatingly accessing components to be provided to said first and second displays.

4. The display system of claim 1 wherein said accessing means provides for the interleaved storage of said components of said first and second independent displayable images in proportion to the respective display resolutions and color depth of said first and second independent displayable images.

5. The display system of claim 1, 3 or 4 wherein said video memory includes a first portion for storing control data and a second portion for storing said components of said first and second independent displayable images, said first portion being further subdivided to provide respective control data storage areas for said first and second independent displayable images, said video controller being coupled to said video memory to permit the reading and writing of control data to said first portion.

6. A display subsystem providing for the simultaneous redisplay of independent images to multiple independent display devices, said display subsystem comprising:

a) a video memory storage unit providing for the storage and retrieval of pixel data in response to address control signals, said pixel data including a first display image and a second display image, said pixel data corresponding to said first display image being interleaved with said pixel data corresponding to said second display image;

b) a first display interface providing for the transfer of first display control and data signals;

c) a second display interface providing for the transfer of second display control and data signals;

d) a data buffer coupled to said video memory storage unit and coupleable to an external data bus to permit the direct transfer of data between said external data bus and said video memory storage unit; and e) a video controller coupled to said video memory storage unit, said data buffer, and to said first and second display interfaces, said video controller generating said addressing signals to retrieve said pixel data in a sequential address sequence, said video controller further generating said first and second display and control signals from respective subsets of said pixel data corresponding to said first and second display images.

7. The display subsystem of claim 6 wherein said video memory storage unit includes a control register store that provides for the storage of first and second sets of control data defining the operation of said video controller relative to the generation of said addressing signals and said first and second display and control signals.

8. The display subsystem of claim 7 wherein said pixel data corresponding to said first and second display images is interleaved in relation to the respective display resolution and color depths of said first and second display images.

9. A computer system providing for the simultaneous independent display of computer images on a plurality of independent video output devices, said computer system comprising:

a) an addressable video data memory providing for the storage of register control data in a first memory area and image data in a second memory area;

b) a first interface coupleable to a first video output device;

c) a second interface coupleable to a second video output device; and d) an integrated circuit coupled to said video data memory, said integrated circuit including:

i) control means for addressing said video data memory to transfer said register control data and said image data between said video data memory and said control means, said control means providing for the logical establishment of first and second sets of said register control data in said first memory area, said control means providing for the mutually interleaved storage of predetermined sub-portions of first and second image data sets in said second memory area, said control means further providing for the sequential addressing of said second memory area to store and retrieve respective interleaved sub-portions of said first and second image data sets;

ii) sequencer means, responsive to the interleave of said sub-portions as provided said control means, for sequentially providing said respective sub-portions of said first and second image data sets separately to said first and second interfaces; and iii) buffer means for providing a first data path between said video data memory and said control means, a second data path between said video data memory and said sequencer means, and a third data path between said video data memory and an external data interface.

10. The computer system of claim 7 wherein said addressable video data memory includes a burst mode accessible random access memory for storing said image data.

* * * * *